(12) United States Patent
Sumino et al.

(10) Patent No.: US 12,168,857 B2
(45) Date of Patent: Dec. 17, 2024

(54) EXCAVATOR AND METHOD OF CONTROLLING EXCAVATOR

(71) Applicant: Komatsu Ltd., Tokyo (JP)

(72) Inventors: Wataru Sumino, Tokyo (JP); Shinobu Nagura, Tokyo (JP); Yuuki Yokoyama, Tokyo (JP); Masatoshi Ikeda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 18/275,890

(22) PCT Filed: Feb. 28, 2022

(86) PCT No.: PCT/JP2022/008178
§ 371 (c)(1),
(2) Date: Aug. 4, 2023

(87) PCT Pub. No.: WO2022/202117
PCT Pub. Date: Sep. 29, 2022

(65) Prior Publication Data
US 2024/0117600 A1 Apr. 11, 2024

(30) Foreign Application Priority Data
Mar. 24, 2021 (JP) ................................. 2021-050619

(51) Int. Cl.
*E02F 9/22* (2006.01)
*E02F 9/12* (2006.01)
(Continued)

(52) U.S. Cl.
CPC ............ *E02F 9/2217* (2013.01); *E02F 9/123* (2013.01); *E02F 9/2228* (2013.01); *E02F 9/26* (2013.01);
(Continued)

(58) Field of Classification Search
CPC . E02F 9/123; E02F 9/2217; F15B 2011/0243; F15B 2011/0246; F15B 21/14; F16H 61/4069; F16H 61/4157
See application file for complete search history.

(56) References Cited

U.S. PATENT DOCUMENTS 6,338,247 B1 * 1/2002 Drin .................... F16H 61/4017
60/494
10,801,616 B2 * 10/2020 Hinsberger ......... F16H 61/4017
(Continued)

FOREIGN PATENT DOCUMENTS

DE 10030137 A1 * 2/2001 ......... F16H 61/4026
JP 2013-104244 A 5/2013
(Continued)

OTHER PUBLICATIONS

DE10030137A1_t machine translation thereof (Year: 2001).*
WO2019004156A1_t machine translation thereof (Year: 2019).*

*Primary Examiner* — Kenneth Bomberg
*Assistant Examiner* — Matthew Wiblin
(74) *Attorney, Agent, or Firm* — Locke Lord LLP

(57) ABSTRACT

An excavator includes: a swing motor driven by oil from a swing pump coupled to a power take-off and driven by an engine; a first main oil passage connecting a first discharge port of the swing pump and a first suction port of the swing motor; a second main oil passage connecting a second discharge port of the swing pump and a second suction port of the swing motor; a neutral retention valve disposed in the first main oil passage and the second main oil passage and controlling passage of oil; a regenerative energy absorbing device coupled to the power take-off and absorbs regenerative energy generated by oil from the swing motor to the swing pump via a meter-out opening of the neutral retention valve; and a valve control section controlling an area of the (Continued)

meter-out opening based on a state of the regenerative energy absorbing device.

3 Claims, 9 Drawing Sheets

(51) Int. Cl.
 *E02F 9/26* (2006.01)
 *F15B 13/02* (2006.01)
(52) U.S. Cl.
 CPC ............ *F15B 13/02* (2013.01); *E02F 9/2285* (2013.01); *E02F 9/2292* (2013.01); *E02F 9/2296* (2013.01)

(56) References Cited

U.S. PATENT DOCUMENTS

| | | | |
|---|---|---|---|
| 11,214,942 B2 * | 1/2022 | Kondo | ................... F15B 21/14 |
| 2016/0377097 A1 * | 12/2016 | Cosoli | ................ F16H 61/4096 |
| | | | 60/327 |
| 2017/0306590 A1 | 10/2017 | Kondo et al. | |
| 2018/0016770 A1 | 1/2018 | Honda et al. | |

FOREIGN PATENT DOCUMENTS

| | | | |
|---|---|---|---|
| JP | 2013-124736 A | 6/2013 | |
| JP | 2016-80009 A | 5/2016 | |
| WO | 2016/152650 A1 | 9/2016 | |
| WO | 2016/158708 A1 | 10/2016 | |
| WO | WO-2019004156 A1 * | 1/2019 | ................ E02F 9/22 |

* cited by examiner

EXCAVATOR AND METHOD OF CONTROLLING EXCAVATOR

FIELD

The present disclosure relates to an excavator and a method of controlling the excavator.

BACKGROUND

In a technical field related to an excavator, there is a known excavator including a neutral retention valve, as disclosed in Patent Literature 1.

CITATION LIST

Patent Literature

Patent Literature 1: JP 2013-104244 A

SUMMARY

Technical Problem

A swing hydraulic pump is driven by an engine. When there is a hydraulic oil closed circuit configured to include a swing hydraulic pump and a swing hydraulic motor, decelerating the swing of an upper swing body causes generation of regenerative energy in the swing hydraulic pump by the hydraulic oil supplied from the swing hydraulic motor to the swing hydraulic pump. At this time, there is a possibility of occurrence of an overrun phenomenon in which the rotational speed of the engine becomes excessively high.

An object of the present disclosure is to suppress occurrence of an overrun phenomenon.

Solution to Problem

An excavator comprises: a power take-off; an engine coupled to the power take-off; a swing hydraulic pump coupled to the power take-off and driven by the engine; a swing hydraulic motor driven by hydraulic oil discharged from the swing hydraulic pump; a first main oil passage that connects a first discharge port of the swing hydraulic pump and a first suction port of the swing hydraulic motor to each other; a second main oil passage that connects a second discharge port of the swing hydraulic pump and a second suction port of the swing hydraulic motor to each other; a neutral retention valve that is disposed in the first main oil passage and the second main oil passage and controls passage of hydraulic oil; a regenerative energy absorbing device that is coupled to the power take-off and absorbs regenerative energy generated by hydraulic oil supplied from the swing hydraulic motor to the swing hydraulic pump via a meter-out opening of the neutral retention valve; and a valve control section that controls an area of the meter-out opening based on a state of the regenerative energy absorbing device.

Advantageous Effects of Invention

According to the present disclosure, occurrence of an overrun phenomenon is suppressed.

DESCRIPTION OF EMBODIMENTS

Hereinafter, embodiments according to the present disclosure will be described with reference to the drawings, but the present disclosure is not limited to the embodiments. The constituents described in the individual embodiments below can be appropriately combined with each other. In some cases, some of the constituents is not utilized.

First Embodiment

Figure 1:
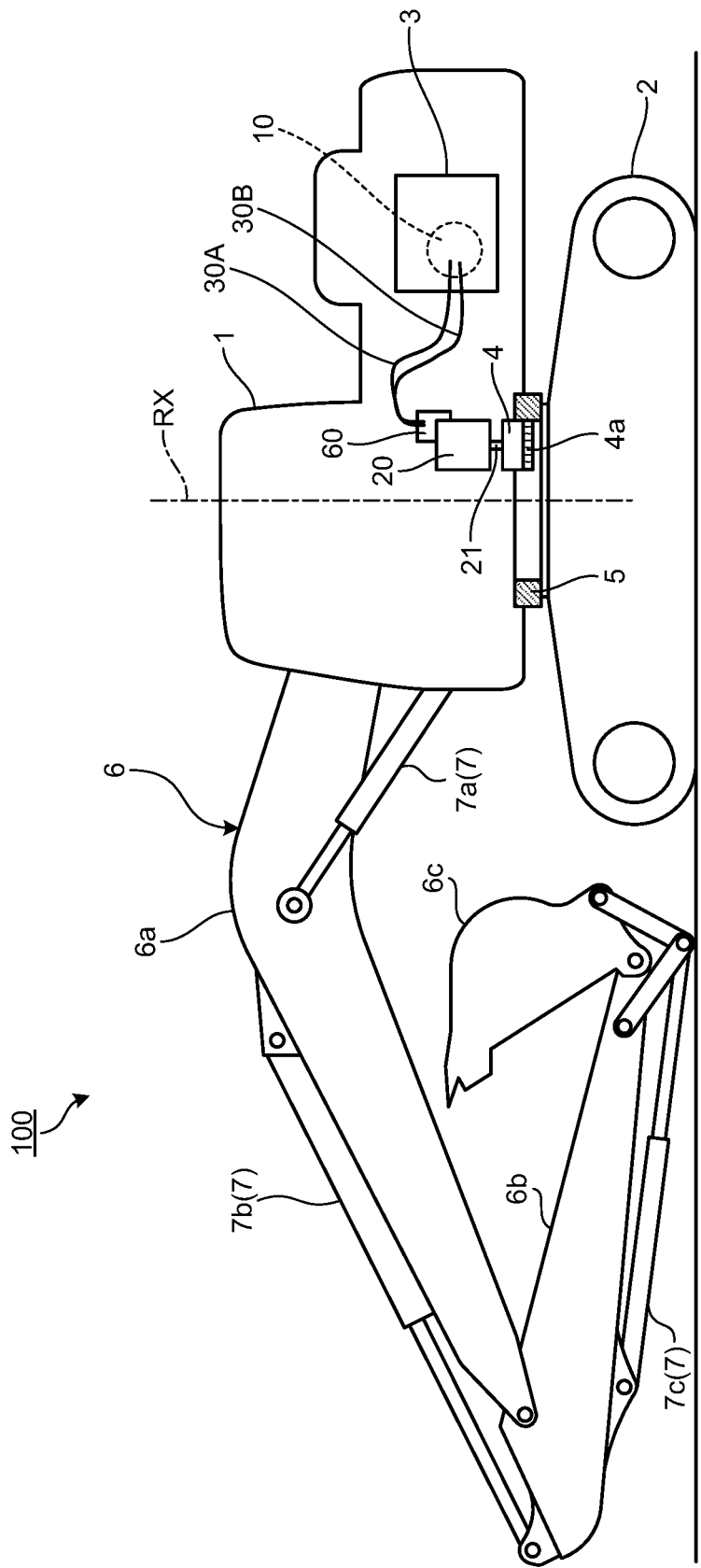
FIG. 1 is a side view illustrating an excavator according to a first embodiment.

A first embodiment will be described. FIG. 1 is a side view schematically illustrating an excavator 100 according to the present embodiment. As illustrated in FIG. 1, the excavator 100 includes an upper swing body 1, a lower carriage 2, working equipment 6, and a working equipment hydraulic cylinder 7. The upper swing body 1 is supported by the lower carriage 2. The upper swing body 1 swings about a swing axis RX. The working equipment 6 is coupled to the upper swing body 1. The working equipment 6 includes a boom 6a, an arm 6b, and a bucket 6c. The working equipment hydraulic cylinder 7 causes the working equipment 6 to operate. The working equipment hydraulic cylinder 7 includes a boom cylinder 7a, an arm cylinder 7b, and a bucket cylinder 7c.

Figure 2:
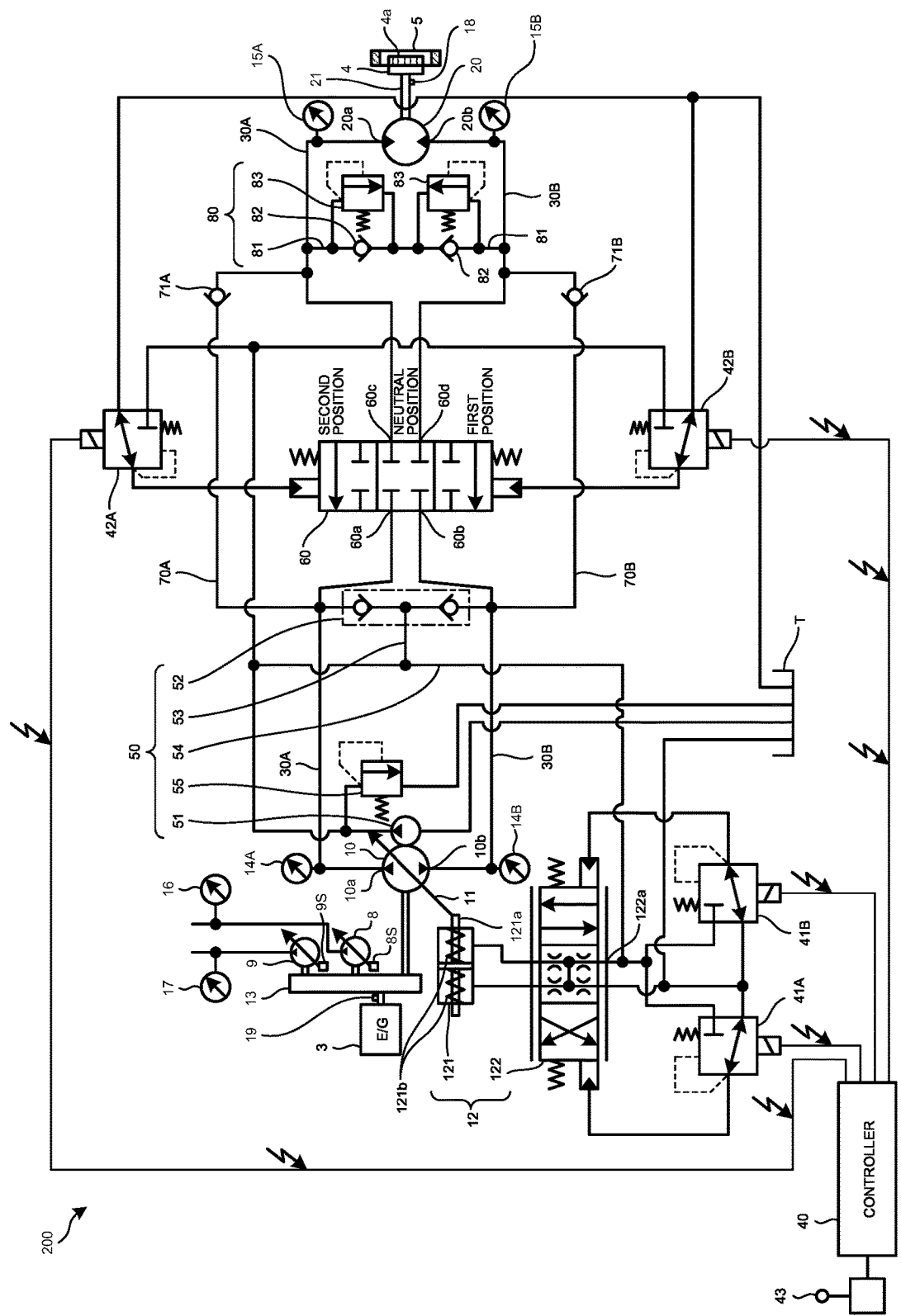
FIG. 2 is a diagram illustrating a hydraulic system according to the first embodiment.

FIG. 2 is a diagram illustrating a hydraulic system 200 according to the present embodiment. The hydraulic system 200 is mounted on the excavator 100. As illustrated in FIGS. 1 and 2, the excavator 100 includes an engine 3, a power take-off 13, a swing hydraulic pump 10, a working equipment hydraulic pump 8, an auxiliary equipment hydraulic pump 9, a swing hydraulic motor 20, a working equipment hydraulic cylinder 7, a first main oil passage 30A, a second main oil passage 30B, a neutral retention valve 60, a first oil supply passage 70A, a second oil supply passage 70B, a charge unit 50, a regulator unit 80, a first pump pressure sensor 14A, a second pump pressure sensor 14B, a first motor pressure sensor 15A, a second motor pressure sensor 15B, a working equipment pump pressure sensor 16, an auxiliary equipment pump pressure sensor 17, a swing speed sensor 18, an engine rotational speed sensor 19, an operation lever 43, and a controller 40.

The engine 3, the swing hydraulic pump 10, the working equipment hydraulic pump 8, and the auxiliary equipment hydraulic pump 9 are each coupled to the power take-off 13. The power take-off 13 distributes power generated by the engine 3 to each of the swing hydraulic pump 10, the working equipment hydraulic pump 8, and the auxiliary equipment hydraulic pump 9. The engine 3 drives each of the swing hydraulic pump 10, the working equipment hydraulic pump 8, and the auxiliary equipment hydraulic pump 9 via the power take-off 13.

The swing hydraulic pump 10 is coupled to the power take-off 13. The swing hydraulic pump 10 is driven by the engine 3. The swing hydraulic pump 10 discharges hydraulic oil for driving the swing hydraulic motor 20. The swing hydraulic pump 10 is a variable displacement hydraulic pump that changes a displacement volume and a discharge direction of the hydraulic oil by altering an inclination angle of a swash plate 11. The swing hydraulic pump 10 includes a displacement control unit 12 for allowing operation of the swash plate 11. The displacement control unit 12 includes a displacement control cylinder 121 provided for allowing operation of the swash plate 11 of the swing hydraulic pump 10, and a displacement control valve 122 that controls the supply of hydraulic oil to two pressure chambers of the displacement control cylinder 121.

The displacement control cylinder 121 is connected to the swash plate 11 of the swing hydraulic pump 10 via a piston rod 121a. Moving the piston rod 121a allows a tilting operation of the swash plate 11 of the swing hydraulic pump 10. The displacement control cylinder 121 includes a built-in spring 121b that biases the piston rod 121a so that the inclination angle of the swash plate 11 becomes zero in a normal state.

The displacement control valve 122 operates by pilot pressure applied via two displacement control proportional solenoid valves 41A and 41B. The displacement control proportional solenoid valves 41A and 41B operate based on a control signal output from the controller 40. The position of the piston rod 121a is altered by supplying and discharging oil to and from the two pressure chambers of the displacement control cylinder 121. The oil supplied to the displacement control cylinder 121 via an oil supply port 122a of the displacement control valve 122 is discharged from a discharge port of a charge pump 51 described below.

The working equipment hydraulic pump 8 is coupled to the power take-off 13. The working equipment hydraulic pump 8 is driven by the engine 3. The working equipment hydraulic pump 8 discharges hydraulic oil for driving the working equipment hydraulic cylinder 7 illustrated in FIG. 1. The working equipment hydraulic pump 8 is a variable displacement hydraulic pump.

The auxiliary equipment hydraulic pump 9 is coupled to the power take-off 13. The auxiliary equipment hydraulic pump 9 is driven by the engine 3. The auxiliary equipment hydraulic pump 9 discharges hydraulic oil for driving an auxiliary equipment mounted on the excavator 100. An example of the auxiliary equipment is a fan. The auxiliary equipment hydraulic pump 9 is a variable displacement hydraulic pump.

The swing hydraulic motor 20 is driven by hydraulic oil discharged from the swing hydraulic pump 10. The swing hydraulic motor 20 generates power to allow the upper swing body 1 to perform swinging. As illustrated in FIG. 1, the swing hydraulic motor 20 is disposed in the upper swing body 1 such that an output shaft 21 of the swing hydraulic motor 20 faces downward. An output gear 4a of a swing speed reducer 4 connected to the output shaft 21 meshes with a swing ring 5 of the lower carriage 2. When the swing hydraulic motor 20 is driven, the output gear 4a rotates about the output shaft 21 and at the same time revolves about the swing axis RX along the swing ring 5 of the lower carriage 2, leading to the rotation of the upper swing body 1 about the swing axis RX with respect to the lower carriage 2. The rotation direction of the swing hydraulic motor 20 can be altered according to the supply direction of the hydraulic oil from the swing hydraulic pump 10. The upper swing body 1 illustrated in FIG. 1 can swing clockwise or counterclockwise when viewed from above.

The working equipment hydraulic cylinder 7 illustrated in FIG. 1 is driven by the hydraulic oil discharged from the working equipment hydraulic pump 8. The working equipment hydraulic cylinder 7 generates power for allowing operation of the working equipment 6.

As illustrated in FIG. 2, the first main oil passage 30A connects a first discharge port 10a of the swing hydraulic pump 10 and a first suction port 20a of the swing hydraulic motor 20 to each other. The second main oil passage 30B connects a second discharge port 10b of the swing hydraulic pump 10 and a second suction port 20b of the swing hydraulic motor 20 to each other. The first main oil passage 30A and the second main oil passage 30B constitute a hydraulic oil closed circuit together with the swing hydraulic pump 10 and the swing hydraulic motor 20.

The neutral retention valve 60 is disposed so as to be interposed between the first main oil passage 30A and the second main oil passage 30B. The neutral retention valve 60 controls passage of the hydraulic oil between the swing hydraulic pump 10 and the swing hydraulic motor 20. The neutral retention valve 60 operates by pilot pressure applied via two neutral retention proportional solenoid valves 42A and 42B. The neutral retention proportional solenoid valves 42A and 42B operate based on a control signal output from the controller 40.

The neutral retention valve 60 includes: a first pump port 60a connected to the first discharge port 10a of the swing hydraulic pump 10; a second pump port 60b connected to the second discharge port 10b of the swing hydraulic pump 10; a first motor port 60c connected to the first suction port 20a of the swing hydraulic motor 20; and a second motor port 60d connected to the second suction port 20b of the swing hydraulic motor 20.

A spool of the neutral retention valve 60 moves to a neutral position, a first position, and a second position. When the spool of the neutral retention valve 60 is disposed at the neutral position, the passage of the hydraulic oil between the first pump port 60a and the first motor port 60c is interrupted, and the passage of the hydraulic oil between the second pump port 60b and the second motor port 60d is interrupted. When the spool of the neutral retention valve 60 is disposed at the first position, the passage of the hydraulic oil between the first pump port 60a and the first motor port 60c is interrupted, while the passage of the hydraulic oil from the second motor port 60d to the second pump port 60b is permitted. When the spool of the neutral retention valve 60 is disposed at the second position, the passage of the hydraulic oil between the second pump port 60b and the second motor port 60d is interrupted, while the passage of the hydraulic oil from the first motor port 60c to the first pump port 60a is permitted.

The first oil supply passage 70A is disposed to bypass the neutral retention valve 60. The first oil supply passage 70A connects the first discharge port 10a of the swing hydraulic pump 10 and the first suction port 20a of the swing hydraulic motor 20 to each other. The second oil supply passage 70B is disposed to bypass the neutral retention valve 60. The second oil supply passage 70B connects the second discharge port 10b of the swing hydraulic pump 10 and the second suction port 20b of the swing hydraulic motor 20 to each other.

There is disposed an oil supply check valve 71A in the first oil supply passage 70A. There is disposed an oil supply check valve 71B in the second oil supply passage 70B. The oil supply check valves 71A and 71B permits the passage of the hydraulic oil from the swing hydraulic pump 10 to the swing hydraulic motor 20 and blocks the passage of the hydraulic oil from the swing hydraulic motor 20 to the swing hydraulic pump 10.

The charge unit 50 replenishes hydraulic oil when the pressure of either the first main oil passage 30A or the second main oil passage 30B becomes lower than a set pressure. The charge unit 50 includes: a charge pump 51 driven by the engine 3; a charge passage 53 having one end connected to a discharge port of the charge pump 51 and the other end connected to each of the first main oil passage 30A and the second main oil passage 30B via a low-pressure selection valve 52; a charge oil supply passage 54 branching from the charge passage 53 and connected to the oil supply port 122a of the displacement control valve 122; and a charge relief valve 55 connected to the charge passage 53. For example, when the pressure of one of the first main oil passage 30A and the second main oil passage 30B becomes lower than the set pressure of the charge relief valve 55 due to internal leakage of the swing hydraulic pump 10 and the swing hydraulic motor 20, the hydraulic oil is replenished from the charge pump 51 to the main oil passages 30A and 30B on a low-pressure side. When the pressures of the first main oil passage 30A and the second main oil passage 30B are both equal to or higher than the set pressure of the charge relief valve 55, the hydraulic oil discharged from the charge pump 51 is returned to an oil tank T via the charge relief valve 55.

When the pressure in either one of the first main oil passage 30A or the second main oil passage 30B exceeds the set pressure, the regulator unit 80 releases the hydraulic oil to the other of the main oil passages 30A and 30B. The regulator unit 80 includes pressure regulating check valves 82 and pressure control valves 83. A suction oil passage 81, which connects the first main oil passage 30A and the second main oil passage 30B to each other, is interposed between the pressure regulating check valves 82 so that the valves face in opposite directions. The pressure control valves 83 are connected in parallel to the individual pressure regulating check valves 82. When the hydraulic pressure in either one of the main oil passages 30A and 30B, for example, the first main oil passage 30A increases due to the influence of the external force or the like and exceeds the set pressure of the pressure control valve 83, the suction oil passage 81 enters a connected state to allow the oil in the first main oil passage 30A to flow into the second main oil passage 30B on the low-pressure side.

The first pump pressure sensor 14A detects the pressure of the first main oil passage 30A between the first discharge port 10a of the swing hydraulic pump 10 and the neutral retention valve 60. The second pump pressure sensor 14B detects the pressure of the second main oil passage 30B between the second discharge port 10b of the swing hydraulic pump 10 and the neutral retention valve 60.

The first motor pressure sensor 15A detects the pressure of the first main oil passage 30A between the first suction port 20a of the swing hydraulic motor 20 and the neutral retention valve 60. The second motor pressure sensor 15B detects the pressure of the second main oil passage 30B between the second suction port 20b of the swing hydraulic motor 20 and the neutral retention valve 60.

The working equipment pump pressure sensor 16 detects the pressure of the hydraulic oil discharged from the working equipment hydraulic pump 8.

The auxiliary equipment pump pressure sensor 17 detects the pressure of the hydraulic oil discharged from the auxiliary equipment hydraulic pump 9.

The swing speed sensor 18 detects the swing speed of the upper swing body 1.

The engine rotational speed sensor 19 detects the rotational speed of the engine 3.

The operation lever 43 is operated by an operator of the excavator 100. In the present embodiment, the operation lever 43 is operated to allow swinging of at least the upper swing body 1. When the operation lever 43 is operated, an operation signal corresponding to the operation amount and the operation direction of the operation lever 43 is output from the operation lever 43.

Based on the operation signal from the operation lever 43, the controller 40 outputs a control signal corresponding to the operation amount and the operation direction of the operation lever 43 to the displacement control proportional solenoid valves 41A and 41B and the neutral retention proportional solenoid valves 42A and 42B.

When the operation lever 43 is disposed at the neutral position, each of the displacement control valve 122 and the neutral retention valve 60 is disposed at the neutral position. When the displacement control valve 122 is disposed at the neutral position, the inclination angle of the swash plate 11 of the swing hydraulic pump 10 becomes zero. When the inclination angle of the swash plate 11 is zero, the discharge amount of the hydraulic oil from the swing hydraulic pump 10 will be zero even after the engine 3 is started and the swing hydraulic pump 10 is driven, and therefore, the swing hydraulic motor 20 will not rotate.

When the neutral retention valve 60 is disposed at the neutral position, the passage of the hydraulic oil from the swing hydraulic motor 20 to the swing hydraulic pump 10 is blocked. In addition, the first oil supply passage 70A and the second oil supply passage 70B are respectively provided with the oil supply check valves 71A and 71B configured to block passage of hydraulic oil from the swing hydraulic motor 20 to the swing hydraulic pump 10. Therefore, for example, even when the excavator 100 is stopped on a slope and an external force to swing the upper swing body 1 acts on the upper swing body 1, the stop state of the swing hydraulic motor 20 is maintained, which suppresses abrupt swinging of the upper swing body 1.

When the operation lever 43 is operated by the operator to swing the upper swing body 1, a control signal corresponding to the operation amount and the operation direction of the operation lever 43 is output from the controller 40 to each of the displacement control proportional solenoid valves 41A and 41B and the neutral retention proportional solenoid valves 42A and 42B. The inclination angle of the swash plate 11 of the swing hydraulic pump 10 is altered, and the spool of the neutral retention valve 60 moves from the neutral position to the first position or the second position.

For example, when the hydraulic oil is discharged from the first discharge port 10a of the swing hydraulic pump 10 and the spool of the neutral retention valve 60 moves to the first position, the hydraulic oil discharged from the first discharge port 10a of the swing hydraulic pump 10 to the first main oil passage 30A is supplied to the first suction port 20a of the swing hydraulic motor 20 via the first oil supply passage 70A. The hydraulic oil supplied to the swing hydraulic motor 20 is discharged from the second suction port 20b to the second main oil passage 30B, and then supplied to the second discharge port 10b of the swing hydraulic pump 10 via the neutral retention valve 60. In this case, the upper swing body 1 swings clockwise, for example.

For example, when the hydraulic oil is discharged from the second discharge port 10b of the swing hydraulic pump 10 and the spool of the neutral retention valve 60 moves to the second position, the hydraulic oil discharged from the second discharge port 10b of the swing hydraulic pump 10 to the second main oil passage 30B is supplied to the second suction port 20b of the swing hydraulic motor 20 via the second oil supply passage 70B. The hydraulic oil supplied to the swing hydraulic motor 20 is discharged from the first suction port 20a to the first main oil passage 30A, and then supplied to the first discharge port 10a of the swing hydraulic pump 10 via the neutral retention valve 60. In this case, the upper swing body 1 swings counterclockwise, for example.

Figure 3:
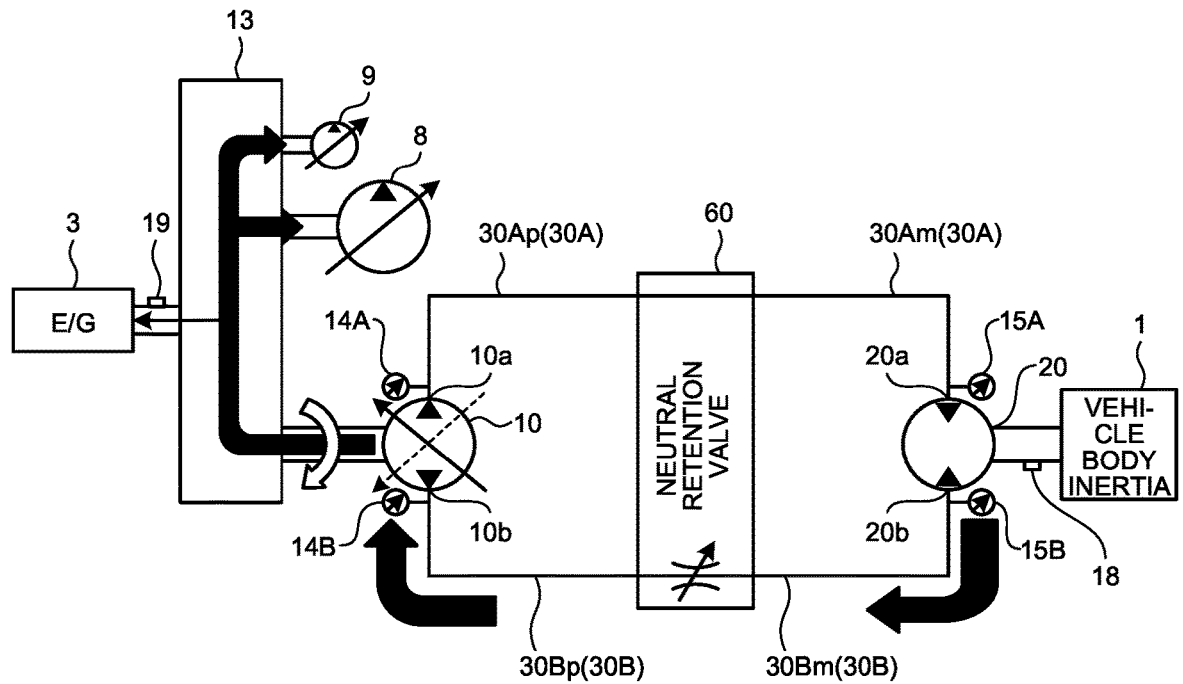
FIG. 3 is a diagram schematically illustrating the hydraulic system according to the first embodiment.
Figure 4:
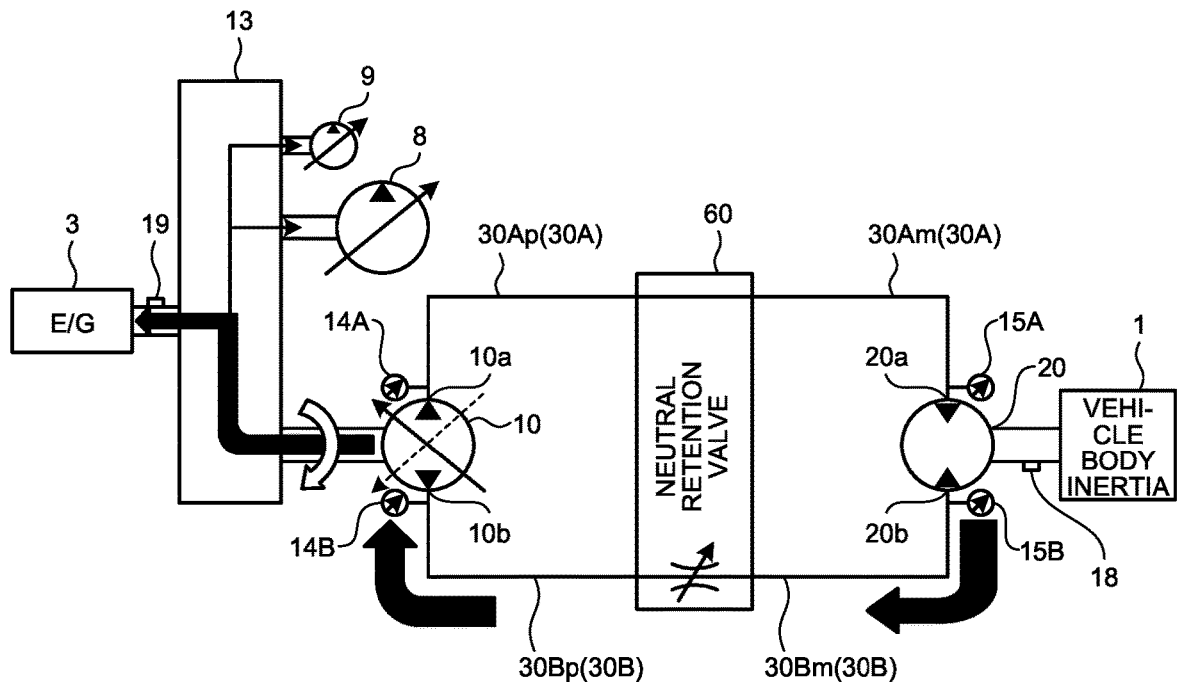
FIG. 4 is a diagram schematically illustrating the hydraulic system according to the first embodiment.

FIG. 3 and FIG. 4 are diagrams each illustrating an example of the hydraulic system 200 according to the present embodiment. As illustrated in FIGS. 3 and 4, each of the swing hydraulic pump 10, the working equipment hydraulic pump 8, and the auxiliary equipment hydraulic pump 9 is driven by the engine 3 via the power take-off 13. The swing hydraulic pump 10, the swing hydraulic motor 20, the first main oil passage 30A, and the second main oil passage 30B constitute a closed circuit.

For example, when the operation lever 43 is operated so that the upper swing body 1 swings clockwise, hydraulic oil for accelerating the swinging of the upper swing body 1 is discharged from the first discharge port 10a. The hydraulic oil discharged from the first discharge port 10a passes through the first main oil passage 30A between the first discharge port 10a and the neutral retention valve 60, passes through the neutral retention valve 60, and then passes through the first main oil passage 30A between the neutral retention valve 60 and the first suction port 20a. In the following description, when the operation lever 43 is operated so that the upper swing body 1 swings clockwise, the first main oil passage 30A between the first discharge port 10a through which the hydraulic oil passes during the swing acceleration period of the upper swing body 1 and the neutral retention valve 60 will be appropriately referred to as an acceleration-side pump passage 30Ap, while the first main oil passage 30A between the neutral retention valve 60 and the first suction port 20a will be appropriately referred to as an acceleration-side motor passage 30Am.

Canceling the operation of the operation lever 43 to swing the upper swing body 1 clockwise starts the deceleration of the swing of the upper swing body 1. In the present embodiment, even when the operation of the operation lever 43 is canceled, the spool of the neutral retention valve 60 continues to be located at the first position during the deceleration period of the swing of the upper swing body 1. When the operation of the operation lever 43 is canceled, the hydraulic oil discharged from the second suction port 20b passes through the second main oil passage 30B between the second suction port 20b and the neutral retention valve 60, passes through the neutral retention valve 60, and then passes through the second main oil passage 30B between the neutral retention valve 60 and the second discharge port 10b. In the following description, when the operation of the operation lever 43 for swing the upper swing body 1 clockwise is canceled, the second main oil passage 30B between the second suction port 20b through which the hydraulic oil passes and the neutral retention valve 60 during the swing deceleration period of the upper swing body 1 will be appropriately referred to as a deceleration-side motor passage 30Bm, while the second main oil passage 30B between the neutral retention valve 60 and the second discharge port 10b will be appropriately referred to as a deceleration-side pump passage 30Bp.

The pressure of the acceleration-side pump passage 30Ap is detected by the first pump pressure sensor 14A. The pressure of the acceleration-side motor passage 30Am is detected by the first motor pressure sensor 15A. The pressure of the deceleration-side motor passage 30Bm is detected by the second motor pressure sensor 15B. The pressure of the deceleration-side pump passage 30Bp is detected by the second pump pressure sensor 14B.

FIGS. 3 and 4 illustrate a state of the hydraulic system 200 during the swing deceleration period of the upper swing body 1. During the swing deceleration period of the upper swing body 1, the inertial force of the upper swing body 1 rotates the swing hydraulic motor 20. The rotation of the swing hydraulic motor 20 allows the hydraulic oil to be discharged from the second suction port 20b. The hydraulic oil discharged from the second suction port 20b is supplied to the swing hydraulic pump 10 via the deceleration-side motor passage 30Bm, a meter-out opening of the neutral retention valve 60, and the deceleration-side pump passage 30Bp, leading to rotation of the swing hydraulic pump 10. That is, during the swing deceleration period of the upper swing body 1, inertial energy of the upper swing body 1 is converted into rotational energy of the swing hydraulic motor 20. The rotational energy of the swing hydraulic motor 20 is converted into fluid energy of hydraulic oil. The fluid energy of the hydraulic oil is converted into rotational energy for the swing hydraulic pump 10. In this manner, during the swing deceleration period of the upper swing body 1, the swing hydraulic motor 20 functions as a hydraulic pump, and the swing hydraulic pump 10 functions as a hydraulic motor. The inertial energy of the upper swing body 1 is regenerated into rotational energy of the swing hydraulic pump 10. That is, in the present embodiment, during the swing deceleration period of the upper swing body 1, regenerative energy (rotational energy) is generated in the swing hydraulic pump 10 by the hydraulic oil supplied from the swing hydraulic motor 20 to the swing hydraulic pump 10 via the neutral retention valve 60.

As illustrated in FIG. 3, for example, when the working equipment hydraulic cylinder 7 is driven, the working equipment hydraulic pump 8 absorbs, via the power take-off 13, at least some of the regenerative energy generated by the swing hydraulic pump 10. The working equipment hydraulic pump 8 can be driven based on the regenerative energy generated in the swing hydraulic pump 10. Similarly, for example, when the fan is driven at a high rotational speed, the auxiliary equipment hydraulic pump 9 absorbs, via the power take-off 13, at least some of the regenerative energy generated in the swing hydraulic pump 10. The auxiliary equipment hydraulic pump 9 can be driven based on the regenerative energy generated in the swing hydraulic pump 10. In the present embodiment, at least either one of the working equipment hydraulic pump 8 or the auxiliary equipment hydraulic pump 9 is coupled to the power take-off 13, and functions as a regenerative energy absorbing device that absorbs regenerative energy generated by the hydraulic oil supplied from the swing hydraulic motor 20 to the swing hydraulic pump 10 via the meter-out opening of the neutral retention valve 60. Consumption of regenerative energy by at least either one of the working equipment hydraulic pump 8 or the auxiliary equipment hydraulic pump 9 will lead to suppression of occurrence of an overrun phenomenon in which the rotational speed of the engine 3 becomes excessively high.

As illustrated in FIG. 4, for example, when there is no drive or a small amount of drive by the working equipment hydraulic cylinder 7 and the fan, the ratio of the consumed energy consumed by each of the working equipment hydraulic pump 8 and the auxiliary equipment hydraulic pump 9, with respect to the regenerative energy generated by the swing hydraulic pump 10, is small. When each of the working equipment hydraulic pump 8 and the auxiliary equipment hydraulic pump 9 consumes a small amount of or no regenerative energy, there is a possibility of occurrence of an overrun phenomenon in which the rotational speed of the engine 3 becomes excessively high.

Therefore, in the present embodiment, when the regenerative energy generated in the swing hydraulic pump 10 exceeds the consumed energy consumed by each of the working equipment hydraulic pump 8 and the auxiliary equipment hydraulic pump 9, the controller 40 reduces the meter-out opening of the neutral retention valve 60 so as to suppress the regenerative energy to be generated in the swing hydraulic pump 10. Reducing the meter-out opening of the neutral retention valve 60 will obtain a larger pressure difference between the deceleration-side motor passage 30Bm and the deceleration-side pump passage 30Bp, leading to conversion of fluid energy of the hydraulic oil into thermal energy in the neutral retention valve 60. That is, some of the regenerative energy is consumed in the neutral retention valve 60. Therefore, even in a situation in which the consumed energy consumed by the regenerative energy absorbing device is small, some of the regenerative energy is consumed in the neutral retention valve 60. This suppresses occurrence of an overrun phenomenon in which the rotational speed of the engine 3 becomes excessively high.

Figure 5:
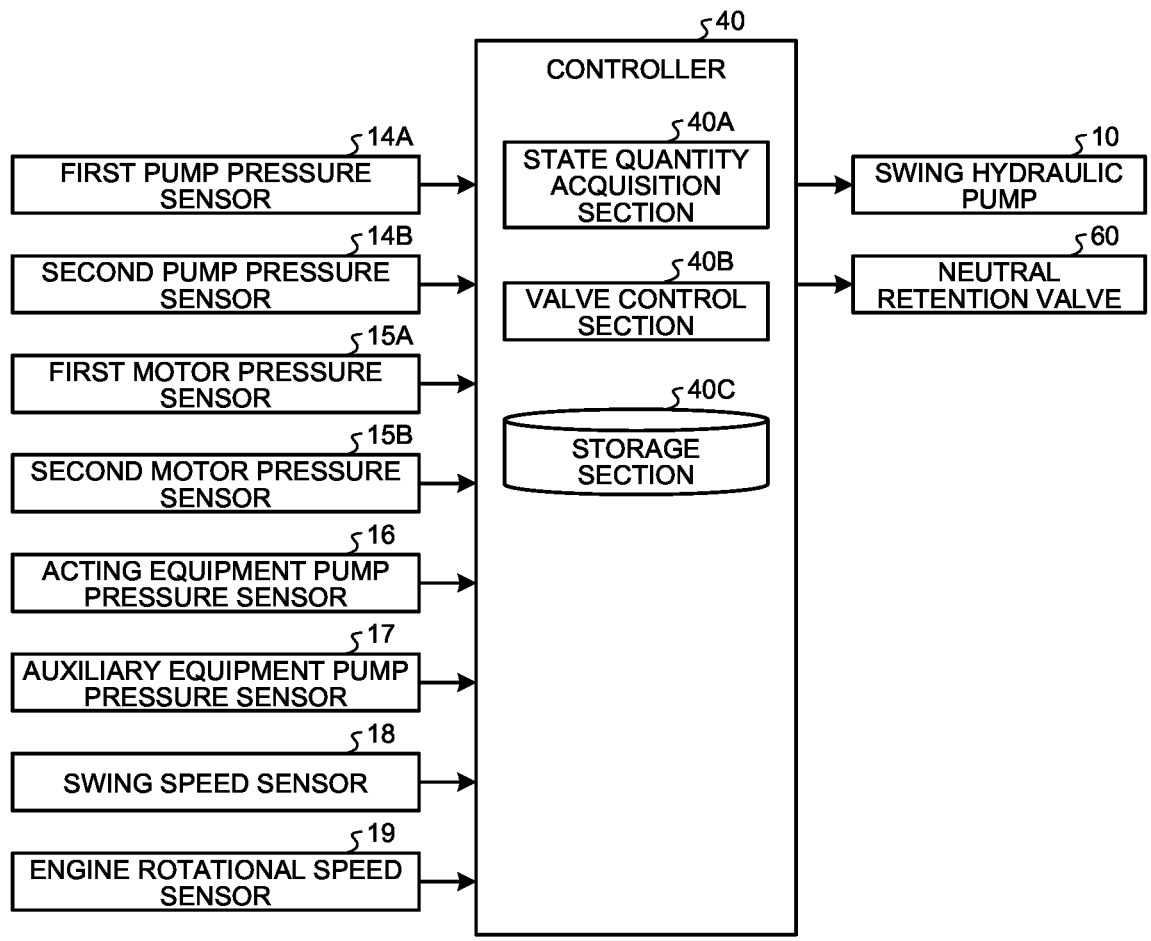
FIG. 5 is a functional block diagram illustrating a controller according to the first embodiment.

FIG. 5 is a functional block diagram illustrating the controller 40 according to the present embodiment. The controller 40 is connected to individual devices, specifically, the first pump pressure sensor 14A, the second pump pressure sensor 14B, the first motor pressure sensor 15A, the second motor pressure sensor 15B, the working equipment pump pressure sensor 16, the auxiliary equipment pump pressure sensor 17, the swing speed sensor 18, and the engine rotational speed sensor 19. The controller 40 is connected to individual devices, specifically, the swing hydraulic pump 10 (displacement control proportional solenoid valves 41A and 41B) and the neutral retention valve 60 (the neutral retention proportional solenoid valves 42A and 42B).

The controller 40 includes a state quantity acquisition section 40A, a valve control section 40B, and a storage section 40C.

The state quantity acquisition section 40A acquires a state quantity indicating a state of the regenerative energy absorbing device. In the present embodiment, the regenerative energy absorbing device includes a device hydraulic pump coupled to the power take-off 13 and driven by the engine 3. The device hydraulic pump includes at least either one of the working equipment hydraulic pump 8 or the auxiliary equipment hydraulic pump 9. In the present embodiment, the regenerative energy generated by the swing hydraulic pump 10 includes regenerative torque Tr generated by the swing hydraulic pump 10. The state quantity includes consumption torque Td of the device hydraulic pump. In the present embodiment, the state quantity acquisition section 40A calculates the consumption torque Td of the device hydraulic pump.

The valve control section 40B controls the area of the meter-out opening of the neutral retention valve 60 based on the state of the regenerative energy absorbing device. In the present embodiment, the valve control section 40B controls the meter-out opening of the neutral retention valve 60 based on the state quantity of the device hydraulic pump calculated by the state quantity acquisition section 40A. As described above, in the present embodiment, the state quantity includes the consumption torque Td of the device hydraulic pump. When the regenerative torque Tr exceeds the consumption torque Td, the valve control section 40B reduces the area of the meter-out opening of the neutral retention valve 60.

Figure 6:
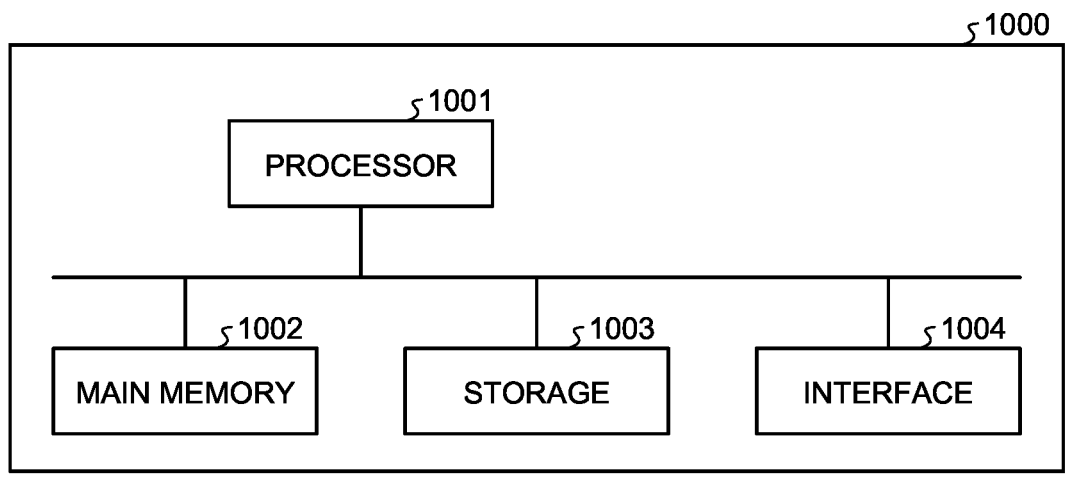
FIG. 6 is a functional block diagram illustrating the controller according to the first embodiment.

FIG. 6 is a block diagram illustrating the controller 40 according to the present embodiment. The controller 40 includes a computer system 1000. The computer system 1000 includes: a processor 1001 such as a central processing unit (CPU); main memory 1002 including non-volatile memory such as read only memory (ROM) and volatile memory such as random access memory (RAM); storage 1003; and an interface 1004 including an input/output circuit. The function of the controller 40 is stored in the storage 1003 as a computer program. The processor 1001 reads the computer program from the storage 1003, expands the program to the main memory 1002, and executes the above-described processes according to the computer program. The computer program may be delivered to the computer system 1000 via a network.

Figure 7:
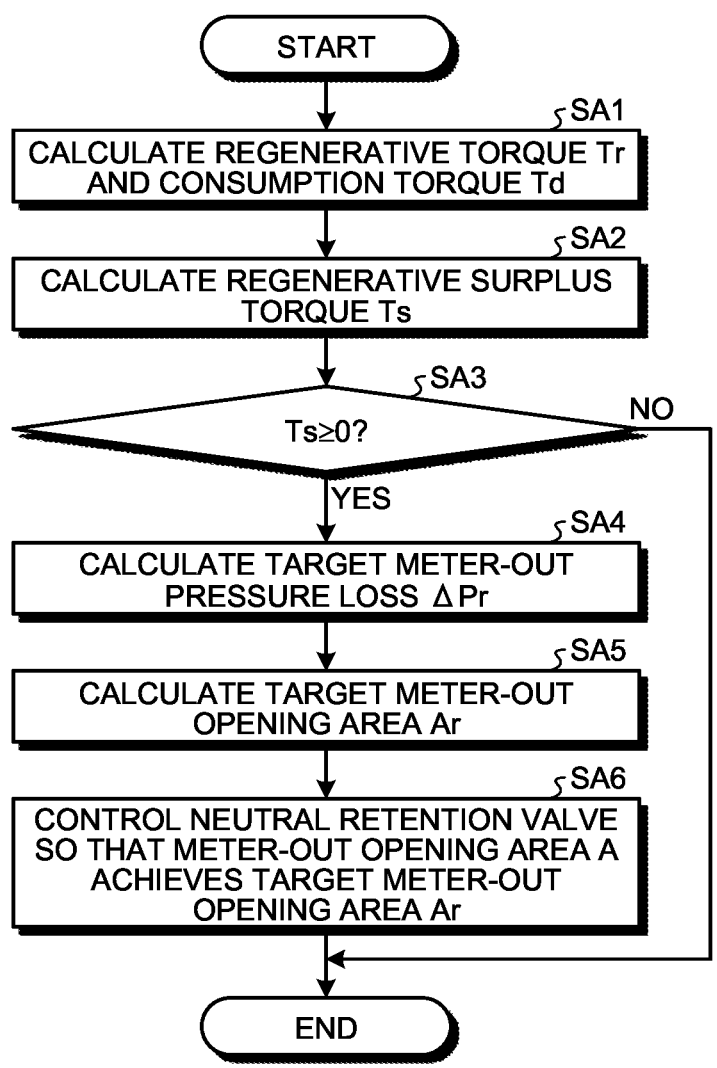
FIG. 7 is a flowchart illustrating a method of controlling the excavator according to the first embodiment.

FIG. 7 is a flowchart illustrating a method of controlling the excavator 100 according to the present embodiment.

The state quantity acquisition section 40A calculates the regenerative torque Tr generated in the swing hydraulic pump 10. The state quantity acquisition section 40A calculates the consumption torque Td of the working equipment hydraulic pump 8 and the auxiliary equipment hydraulic pump 9 which are device hydraulic pumps different from the swing hydraulic pump 10 (step SA1).

The regenerative torque Tr is expressed by the following Formula (1).

$$Tr = Psm \times (Sw \times ge/en) \times \eta s / (200 \times \pi) \qquad (1)$$

In Formula (1), Psm is a pressure of the deceleration-side motor passage 30Bm, Sw is a swing speed of the upper swing body 1, ge is a swing reduction ratio, en is a rotational speed of the engine 3, and $\eta s$ is a pump efficiency of the swing hydraulic pump 10. The pressure Psm is detected by the second motor pressure sensor 15B. The swing speed Sw is detected by the swing speed sensor 18. The swing reduction ratio ge is data specific to the excavator 100 and is stored in advance in the storage section 40C. The rotational speed of the engine 3 is detected by an engine rotational speed sensor 19. The pump efficiency $\eta s$ is data specific to the swing hydraulic pump 10 and is stored in advance in the storage section 40C.

The consumption torque Td is expressed by the following Formula (2).

$$Td = Tm + Tf + Te \qquad (2)$$

In Formula (2), Tm is absorption torque (consumption torque) absorbed by the working equipment hydraulic pump 8, Tf is absorption torque (consumption torque) absorbed by the auxiliary equipment hydraulic pump 9, and Te is engine co-rotating torque.

The absorption torque Tm and the absorption torque Tf are expressed by the following Formulas (3) and (4), respectively.

$$Tm = Pm \times qm \times \eta m / (200 \times \pi) \quad (3)$$

$$Tf = Pf \times qf \times \eta f / (200 \times \pi) \quad (4)$$

In Formula (3), Pm is a pressure of the hydraulic oil discharged from the working equipment hydraulic pump 8, qm is a displacement of the working equipment hydraulic pump 8, and ηm is a pump efficiency of the working equipment hydraulic pump 8. The pressure Pm is detected by the working equipment pump pressure sensor 16. The displacement qm is determined based on a pump displacement command signal output from the controller 40 to the working equipment hydraulic pump 8. The pump efficiency ηm is data specific to the working equipment hydraulic pump 8 and is stored in advance in the storage section 40C. The state quantity acquisition section 40A can calculate the absorption torque Tm based on the pressure Pm derived from the detection data of the working equipment pump pressure sensor 16, the displacement qm derived from the pump displacement command signal, and the pump efficiency ηm stored in the storage section 40C. Incidentally, when the working equipment hydraulic pump 8 includes a swash plate angle sensor 8S that detects the inclination angle of the swash plate of the working equipment hydraulic pump 8 as illustrated in FIG. 2, the displacement qm may be derived from detection data obtained by the swash plate angle sensor 8S.

In Formula (4), Pf is a pressure of the hydraulic oil discharged from the auxiliary equipment hydraulic pump 9, qf is a displacement of the auxiliary equipment hydraulic pump 9, and ηf is a pump efficiency of the auxiliary equipment hydraulic pump 9. The pressure Pf is detected by the auxiliary equipment pump pressure sensor 17. The displacement qf is determined based on a pump displacement command signal output from the controller 40 to the auxiliary equipment hydraulic pump 9. The pump efficiency ηf is data specific to the auxiliary equipment hydraulic pump 9 and is stored in advance in the storage section 40C. The state quantity acquisition section 40A can calculate the absorption torque Tf based on the pressure Pf derived from the detection data of the auxiliary equipment pump pressure sensor 17, the displacement qf derived from the pump displacement command signal, and the pump efficiency ηf stored in the storage section 40C. Incidentally, when the auxiliary equipment hydraulic pump 9 includes a swash plate angle sensor 9S that detects the inclination angle of the swash plate of the auxiliary equipment hydraulic pump 9 as illustrated in FIG. 2, the displacement qf may be derived from detection data obtained by the swash plate angle sensor 9S.

The engine co-rotating torque Te is data specific to the engine 3 and is determined according to the rotational speed en of the engine 3. The storage section 40C stores engine correlation data indicating the relationship between the rotational speed en of the engine 3 and the engine co-rotating torque Te. The state quantity acquisition section 40A can calculate the engine co-rotating torque Te based on the engine correlation data stored in the storage section 40C and the rotational speed en of the engine 3.

The state quantity acquisition section 40A calculates regenerative surplus torque Ts (step SA2).

The regenerative surplus torque Ts is expressed by the following Formula (5).

$$Ts = Tr - Td \quad (5)$$

The valve control section 40B determines whether the regenerative surplus torque Ts calculated in step S2 is 0 or more. That is, the valve control section 40B determines whether the regenerative torque Tr exceeds the consumption torque Td (step SA3).

When it is determined in step S3 that the regenerative torque Tr does not exceed the consumption torque Td (step SA3: No), the valve control section 40B maintains the size of the meter-out opening of the neutral retention valve 60. The meter-out opening is maintained in a fully open state, for example.

When it is determined in step SA3 that the regenerative torque Tr exceeds the consumption torque Td (step SA3: Yes), the valve control section 40B starts overrun prevention control of suppressing occurrence of an overrun phenomenon. In the overrun prevention control, the valve control section 40B calculates a target meter-out pressure loss ΔPr of the neutral retention valve 60 (step SA4).

The target meter-out pressure loss ΔPr is expressed by the following Formula (6).

$$\Delta Pr = Ts \times 200 \times \pi / (Sw \times ge / en) \quad (6)$$

Next, the valve control section 40B calculates a target meter-out opening area Ar of the neutral retention valve 60 (step SA5).

Figure 8:
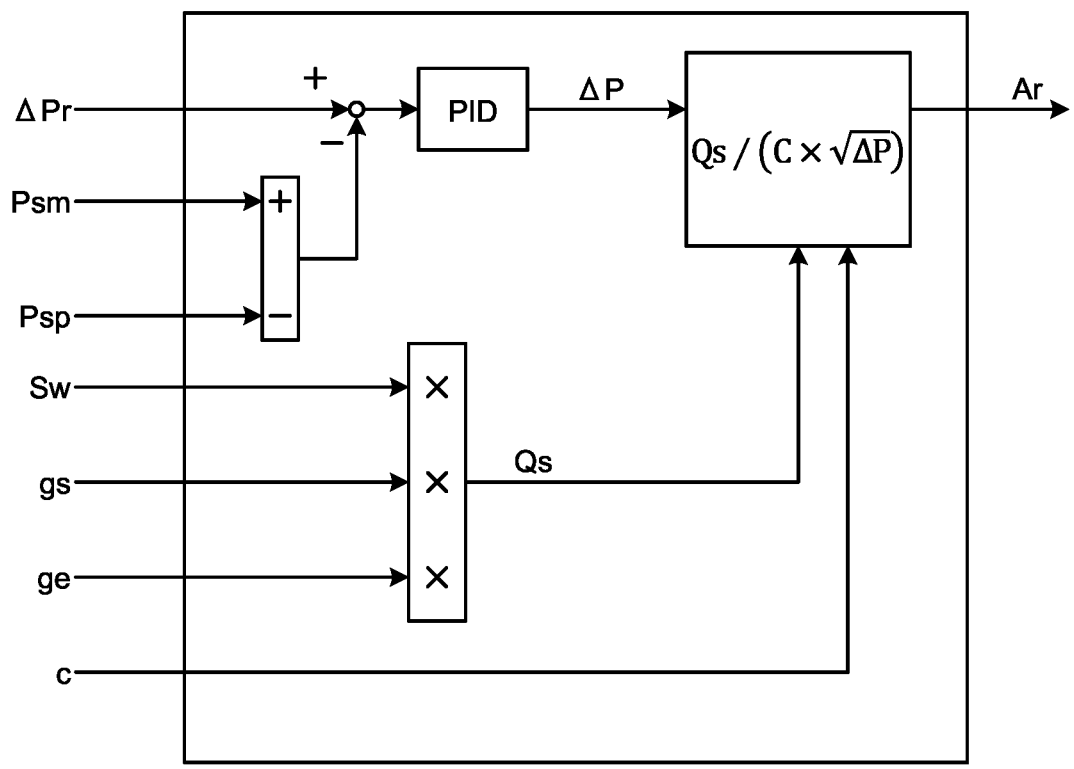
FIG. 8 is a diagram illustrating a method of calculating a target meter-out opening area according to the first embodiment.

FIG. 8 is a diagram illustrating a method of calculating the target meter-out opening area Ar according to the present embodiment. In FIG. 8, Psm is a pressure of the deceleration-side motor passage 30Bm, Psp is a pressure of the deceleration-side pump passage 30Bp, Sw is a swing speed of the upper swing body 1, qs is a displacement of the swing hydraulic motor 20, ge is a swing speed ratio, and c is a flow rate coefficient of the neutral retention valve 60. The pressure Psm is detected by the second motor pressure sensor 15B. The pressure Psp is detected by the second pump pressure sensor 14B. The swing speed Sw is detected by the swing speed sensor 18. qs is data specific to the swing hydraulic motor 20 and is stored in advance in the storage section 40C. The swing reduction ratio ge is data specific to the excavator 100 and is stored in advance in the storage section 40C. The flow rate coefficient c is data specific to the neutral retention valve 60 and is stored in the storage section 40C in advance.

The PID control based on the target meter-out pressure loss ΔPr and a deviation amount between the pressure Psm and the pressure Psp is performed, thereby calculating a differential pressure ΔP between the deceleration-side motor passage 30Bm on the upstream side of the neutral retention valve 60 and the deceleration-side pump passage 30Bp on the downstream side. Integrating the swing speed Sw, the displacement qm of the swing hydraulic motor 20, and the swing reduction ratio ge will calculate a swing flow rate Qs. The target meter-out opening area Ar is expressed by the following Formula (7).

$$Ar = Qs / (C \times \sqrt{\Delta P}) \quad (7)$$

The valve control section 40B controls the neutral retention valve 60 so that the meter-out opening area A achieves the target meter-out opening area Ar (step SA6).

The spool of the neutral retention valve 60 is moved by the pilot pressure applied via the neutral retention proportional solenoid valves 42A and 42B. First correlation data indicating the relationship between the meter-out opening area A and the spool movement amount is stored in advance in the storage section 40C. In addition, second correlation data indicating the relationship between the movement amount of the spool and the command current applied to the neutral retention proportional solenoid valves 42A and 42B is also stored in the storage section 40C in advance. Based on the first correlation data and the second correlation data, the valve control section 40B outputs a control signal controlling the neutral retention proportional solenoid valves 42A and 42B so that the meter-out opening area A achieves the target meter-out opening area Ar.

Figure 9:
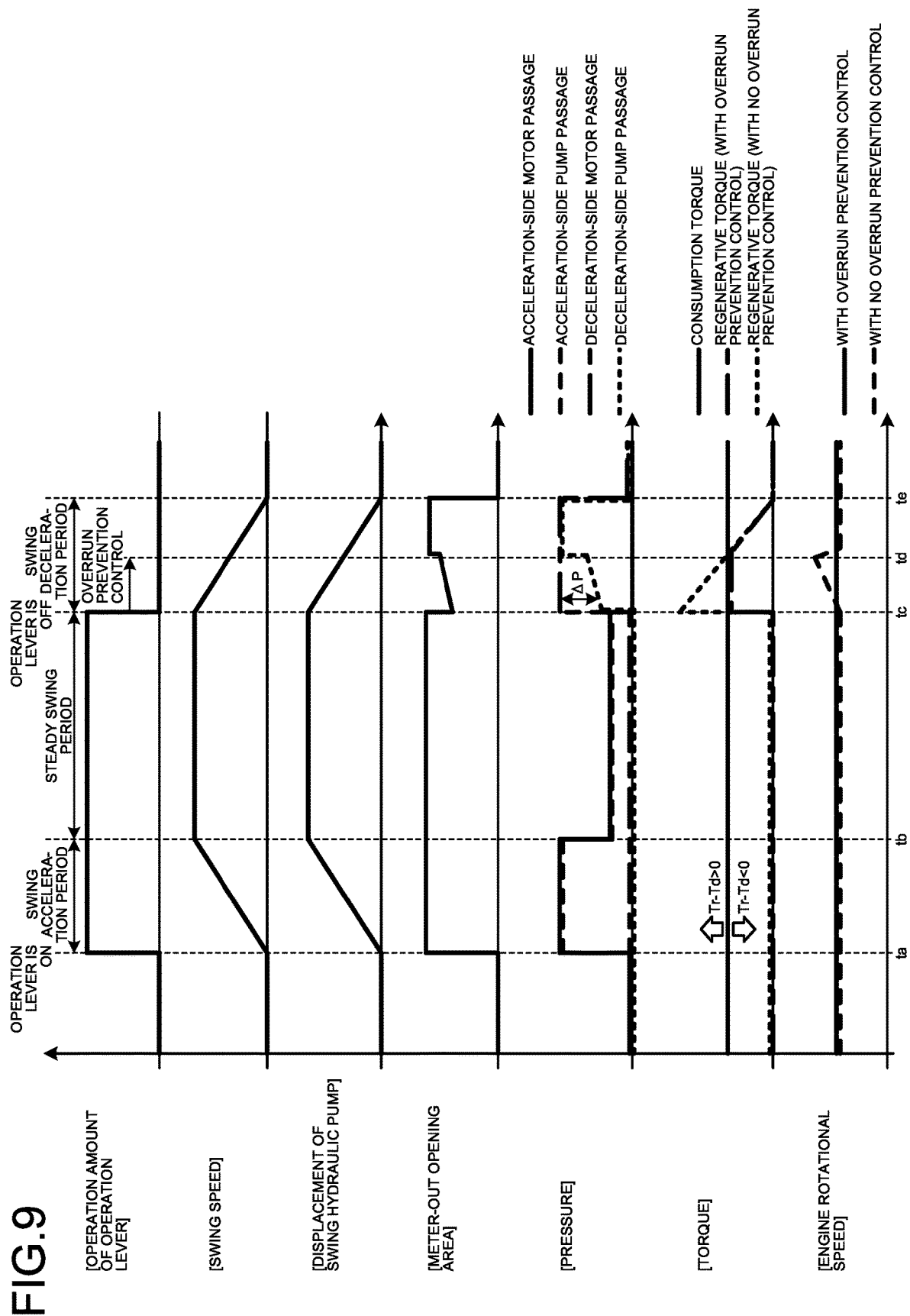
FIG. 9 is a time chart illustrating a method of controlling the excavator according to the first embodiment.

FIG. 9 is a time chart illustrating a method of controlling the excavator 100 according to the present embodiment. In FIG. 9, operation of the operation lever 43 is started at a time point ta. At a time point tc, the operation of the operation lever 43 is canceled. The period from the time point ta to the time point tb is a swing acceleration period during which the swing speed of the upper swing body 1 increases. The period from the time point tb to the time point tc is a steady swing period during which the swing speed of the upper swing body 1 is constant. The period from the time point tc to the time point to is a swing deceleration period during which the swing speed of the upper swing body 1 decreases.

During the swing acceleration period, the swing speed Sw and the displacement of the swing hydraulic pump 10 gradually increase. In addition, during the swing acceleration period, the pressure of the acceleration-side pump passage 30Ap and the pressure of the acceleration-side motor passage 30Am are high. During the steady swing period, the swing speed Sw and the displacement of the swing hydraulic pump 10 are constant. In addition, during the steady swing period, the pressure of the acceleration-side pump passage 30Ap and the pressure of the acceleration-side motor passage 30Am are lower than the pressure in the swing acceleration period. During the swing acceleration period and the steady swing period, the pressure of the deceleration-side motor passage 30Bm and the pressure of the deceleration-side pump passage 30Bp are low.

At the time point tc, the overrun prevention control is started. At the time point tc, the regenerative torque Tr is generated in the swing hydraulic pump 10. The valve control section 40B moves the spool of the neutral retention valve 60 so as to reduce the meter-out opening area A of the neutral retention valve 60.

When the swing deceleration period is started at the time point tc, the pressure of the deceleration-side motor passage 30Bm increases. When the meter-out opening area A is reduced by the overrun prevention control, a pressure loss occurs in the neutral retention valve 60, leading to a state in which the pressure of the deceleration-side pump passage 30Bp is lower than the pressure of the deceleration-side motor passage 30Bm. Some of the fluid energy of the hydraulic oil is converted into thermal energy in the neutral retention valve 60. This reduces the regenerative energy (regenerative torque Tr) generated in the swing hydraulic pump 10.

With no execution of the overrun prevention control, the regenerative torque Tr rapidly increases at the time point tc, and then the regenerative torque Tr gradually decreases together with the decrease of the swing speed. With no execution of the overrun prevention control, the regenerative torque Tr exceeds the consumption torque Td. The present embodiment executes overline prevention control is performed, and thus, the maximum value of the regenerative torque Tr does not exceed the consumption torque Td. With execution of overrun prevention control, the rotational speed of the engine 3 does not increase during the period from the time point tc to the time point td. At the time point td, the swing speed decreases and the regenerative torque Tr falls below the consumption torque Td, leading to an end of the overrun prevention control. That is, the meter-out opening area A increases.

As described above, according to the present embodiment, when there is a hydraulic oil closed circuit configured to include the swing hydraulic pump 10 and the swing hydraulic motor 20, decelerating the swing of the upper swing body 1 causes generation of regenerative energy in the swing hydraulic pump 10 by the hydraulic oil supplied from the swing hydraulic motor 20 to the swing hydraulic pump 10. This makes it possible for the working equipment hydraulic pump 8 and the auxiliary equipment hydraulic pump 9, which are regenerative energy absorbing devices coupled to the swing hydraulic pump 10 via the power take-off 13, to absorb regenerative energy and perform driving. When the regenerative energy absorbing device has not absorbed the regenerative energy or the amount of the regenerative energy absorbed is small, the neutral retention valve 60 is controlled so as to reduce the area of the meter-out opening of the neutral retention valve 60 based on the state of the regenerative energy absorbing device. With the reduced area of the meter-out opening, some of the regenerative energy is converted into thermal energy in the neutral retention valve 60. This suppresses occurrence of an overrun phenomenon in which the rotational speed of the engine 3 becomes excessively high.

Second Embodiment

A second embodiment will be described. In the second embodiment, the same components as those in the above-described first embodiment are designated by the same reference numerals, and the description of the components will be simplified or omitted.

In the first embodiment described above, the regenerative energy absorbing device is implemented as the device hydraulic pump (the working equipment hydraulic pump 8 and the auxiliary equipment hydraulic pump 9), and the state quantity is defined as the consumption torque Td. In addition, the overrun prevention control is performed when the regenerative torque Tr exceeds the consumption torque Td. The second embodiment will describe an example in which the regenerative energy absorbing device is implemented as the engine 3, the state quantity is defined as a rotational speed Ne of the engine 3, and the overrun prevention control is to be performed when a rotational speed Ne of the engine 3 exceeds an allowable rotational speed Nm.

Figure 10:
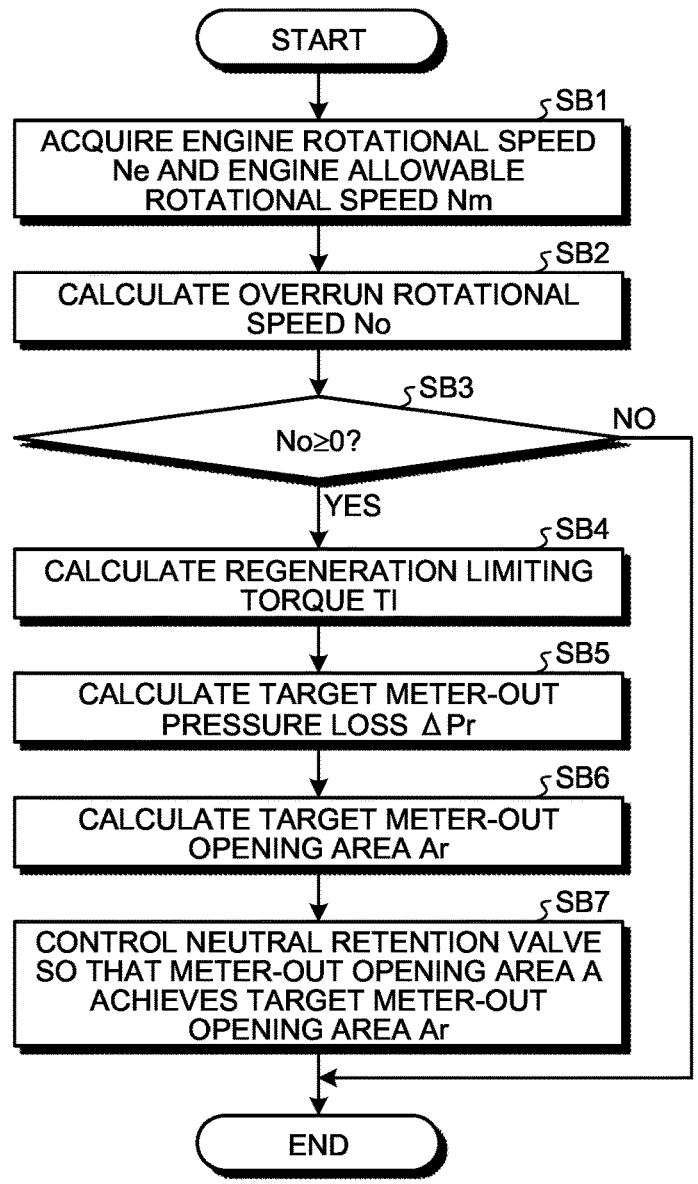
FIG. 10 is a flowchart illustrating a method of controlling an excavator according to a second embodiment.

FIG. 10 is a flowchart illustrating a method of controlling the excavator 100 according to the present embodiment.

The state quantity acquisition section 40A acquires the rotational speed Ne and the allowable rotational speed Nm of the engine 3. The rotational speed Ne of the engine 3 is detected by the engine rotational speed sensor 19. The allowable rotational speed Nm is data specific to the engine 3 and is stored in advance in the storage section 40C (step SB1).

The state quantity acquisition section 40A calculates an overrun rotational speed No (step SB2).

The overrun rotational speed No is expressed by the following Formula (8).

$$No = Ne - Nm \qquad (8)$$

The valve control section 40B determines whether the overrun rotational speed No calculated in step SB2 is 0 or more. That is, the valve control section 40B determines whether the rotational speed Ne of the engine 3 exceeds the allowable rotational speed Nm (step SB3).

In step SB3, when it is determined that the rotational speed Ne of the engine 3 does not exceed the allowable rotational speed Nm (step SB3: No), the valve control section 40B maintains the meter-out opening area A of the neutral retention valve 60.

In step SB3, when it is determined that the rotational speed Ne of the engine 3 exceeds the allowable rotational speed Nm (step SB3: Yes), the overrun prevention control is started. In the overrun prevention control, the valve control section 40B calculates regeneration limiting torque Tl (step SB4).

Figure 11:
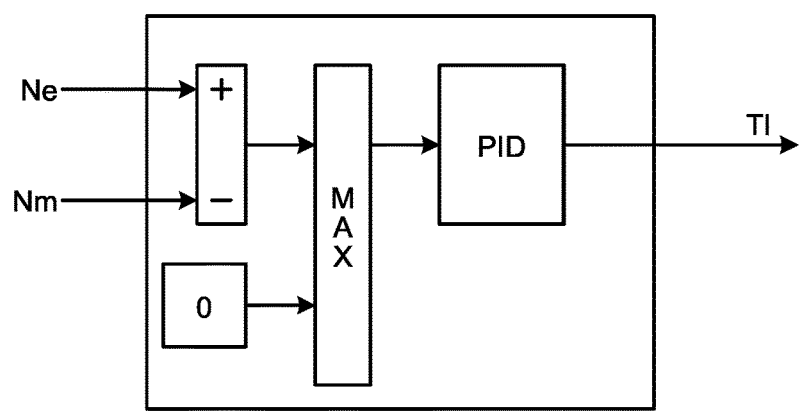
FIG. 11 is a diagram illustrating a method of calculating regeneration limiting torque according to the second embodiment.

FIG. 11 is a diagram illustrating a method of calculating the regeneration limiting torque Tl according to the present embodiment. In FIG. 11, the regeneration limiting torque Tl is calculated by performing the PID control based on a larger value out of the difference between the rotational speed Ne of the engine 3 and the allowable rotational speed Nm, and 0.

The valve control section 40B calculates the target meter-out pressure loss $\Delta Pr$ of the neutral retention valve 60 (step SB5).

The target meter-out pressure loss $\Delta Pr$ is expressed by the following Formula (9).

$$\Delta Pr = Tl \times 200 \times \pi / (Sw \times ge/en) \quad (9)$$

Next, the valve control section 40B calculates the target meter-out opening area Ar of the neutral retention valve 60 (step SB6).

As described with reference to FIG. 8, the valve control section 40B calculates a differential pressure $\Delta P$ between the deceleration-side motor passage 30Bm on the upstream side of the neutral retention valve 60 and the deceleration-side pump passage 30Bp on the downstream side thereof. The target meter-out opening area Ar is expressed by the above-described Formula (7).

The valve control section 40B controls the neutral retention valve 60 so that the meter-out opening area A achieves the target meter-out opening area Ar (step SB7).

Similarly to the first embodiment described above, the valve control section 40B outputs a control signal controlling the neutral retention proportional solenoid valves 42A and 42B so that the meter-out opening area A achieves the target meter-out opening area Ar.

Figure 12:
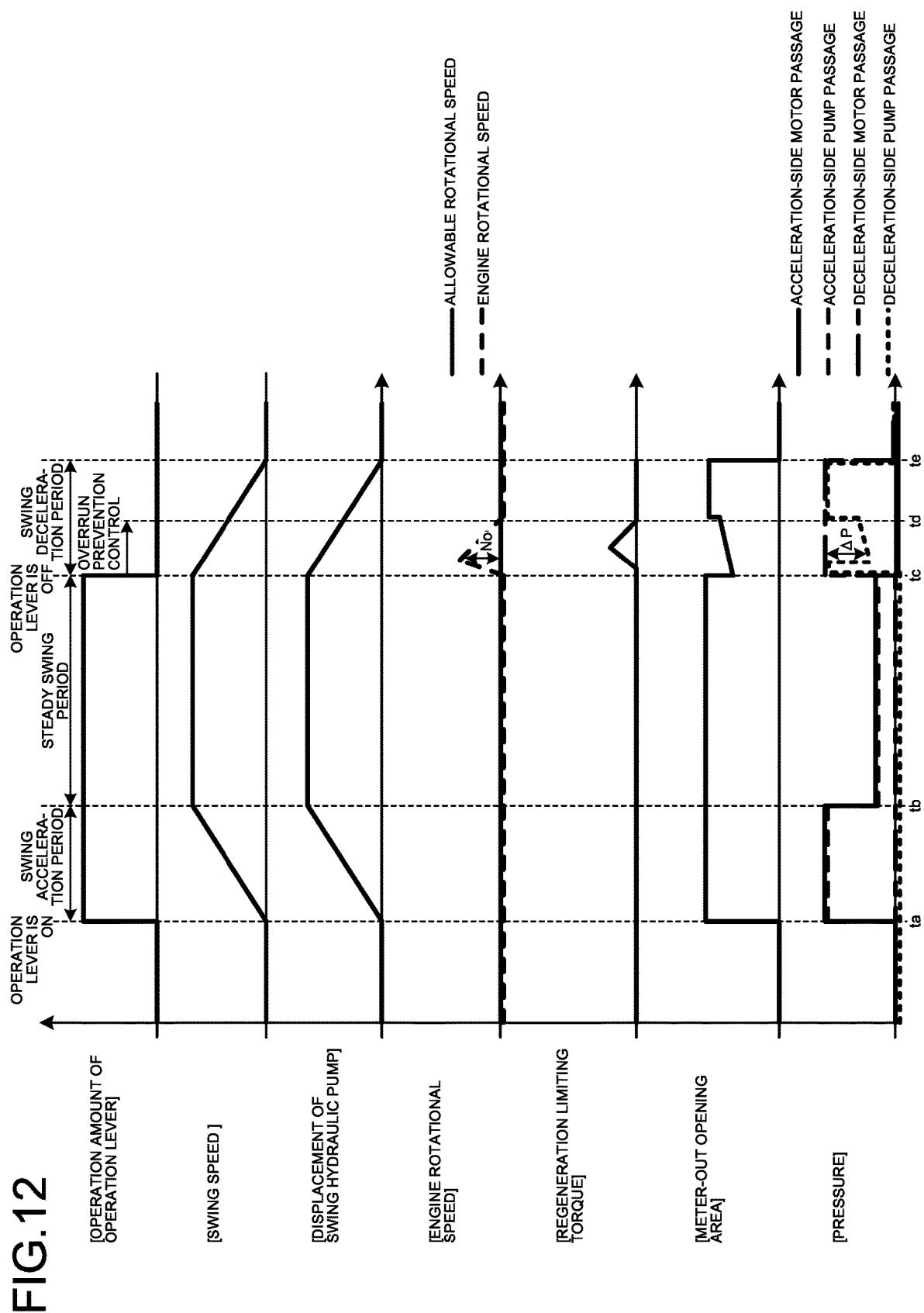
FIG. 12 is a time chart illustrating a method of controlling the excavator according to the second embodiment.

FIG. 12 is a time chart illustrating a method of controlling the excavator 100 according to the present embodiment. In FIG. 12, the operation of the operation lever 43 is started at the time point ta. At a time point tc, the operation of the operation lever 43 is canceled. The period from the time point ta to the time point tb is a swing acceleration period during which the swing speed of the upper swing body 1 increases. The period from the time point tb to the time point tc is a steady swing period during which the swing speed of the upper swing body 1 is constant. The period from the time point tc to the time point to is a swing deceleration period during which the swing speed of the upper swing body 1 decreases.

During the swing acceleration period, the pressure of the acceleration-side pump passage 30Ap and the pressure of the acceleration-side motor passage 30Am are high. During the steady swing period, the pressure of the acceleration-side pump passage 30Ap and the pressure of the acceleration-side motor passage 30Am are low. During the swing acceleration period and the steady swing period, the pressure of the deceleration-side motor passage 30Bm and the pressure of the deceleration-side pump passage 30Bp are low.

At the time point tc, the overrun prevention control is started. At the time point tc, the rotational speed Ne of the engine 3 increases. The valve control section 40B calculates the regeneration limiting torque Tl based on the rotational speed Ne of the engine 3 and the allowable rotational speed Nm. The valve control section 40B reduces the meter-out opening area A in accordance with the regeneration limiting torque Tl to generate the differential pressure $\Delta P$ (pressure loss).

REFERENCE SIGNS LIST

1 UPPER SWING BODY
2 LOWER CARRIAGE
3 ENGINE
4 SWING SPEED REDUCER
4a OUTPUT GEAR
5 SWING RING
6 WORKING EQUIPMENT
6a BOOM
6b ARM
6c BUCKET
7 WORKING EQUIPMENT HYDRAULIC CYLINDER
7a BOOM CYLINDER
7b ARM CYLINDER
7c BUCKET CYLINDER
8 WORKING EQUIPMENT HYDRAULIC PUMP
8S SWASH PLATE ANGLE SENSOR
9 AUXILIARY EQUIPMENT HYDRAULIC PUMP
9S SWASH PLATE ANGLE SENSOR
10 SWING HYDRAULIC PUMP
10a FIRST DISCHARGE PORT
10b SECOND DISCHARGE PORT
11 SWASH PLATE
12 DISPLACEMENT CONTROL UNIT
121 DISPLACEMENT CONTROL CYLINDER
121a PISTON ROD
121b BUILT-IN SPRING
122 DISPLACEMENT CONTROL VALVE
122a OIL SUPPLY PORT
13 POWER TAKE-OFF
14A FIRST PUMP PRESSURE SENSOR
14B SECOND PUMP PRESSURE SENSOR
15A FIRST MOTOR PRESSURE SENSOR
15B SECOND MOTOR PRESSURE SENSOR
16 WORKING EQUIPMENT PUMP PRESSURE SENSOR
17 AUXILIARY EQUIPMENT PUMP PRESSURE SENSOR
18 SWING SPEED SENSOR
19 ENGINE ROTATIONAL SPEED SENSOR
20 SWING HYDRAULIC MOTOR
20a FIRST SUCTION PORT
20b SECOND SUCTION PORT
21 OUTPUT SHAFT
30A FIRST MAIN OIL PASSAGE
30Ap ACCELERATION-SIDE PUMP PASSAGE
30Am ACCELERATION-SIDE MOTOR PASSAGE
30B SECOND MAIN OIL PASSAGE
30Bp DECELERATION-SIDE PUMP PASSAGE
30Bm DECELERATION-SIDE MOTOR PASSAGE
40 CONTROLLER
40A STATE QUANTITY ACQUISITION SECTION
40B VALVE CONTROL SECTION
40C STORAGE SECTION
41A DISPLACEMENT CONTROL PROPORTIONAL SOLENOID VALVE
41B DISPLACEMENT CONTROL PROPORTIONAL SOLENOID VALVE

42A NEUTRAL RETENTION PROPORTIONAL SOLENOID VALVE
42B NEUTRAL RETENTION PROPORTIONAL SOLENOID VALVE
43 OPERATION LEVER
50 CHARGE UNIT
51 CHARGE PUMP
52 LOW-PRESSURE SELECTION VALVE
53 CHARGE PASSAGE
54 CHARGE OIL SUPPLY PASSAGE
55 CHARGE RELIEF VALVE
60 NEUTRAL RETENTION VALVE
60a FIRST PUMP PORT
60b SECOND PUMP PORT
60c FIRST MOTOR PORT
60d SECOND MOTOR PORT
70A FIRST OIL SUPPLY PASSAGE
70B SECOND OIL SUPPLY PASSAGE
71A OIL SUPPLY CHECK VALVE
71B OIL SUPPLY CHECK VALVE
80 REGULATOR UNIT
81 SUCTION OIL PASSAGE
82 PRESSURE REGULATING CHECK VALVE
83 PRESSURE CONTROL VALVE
100 EXCAVATOR
200 HYDRAULIC SYSTEM
RX SWING AXIS
T OIL TANK

The invention claimed is:

1. An excavator comprising:
a power take-off;
an engine coupled to the power take-off;
a swing hydraulic pump coupled to the power take-off and driven by the engine;
a swing hydraulic motor driven by hydraulic oil discharged from the swing hydraulic pump;
a first main oil passage that connects a first discharge port of the swing hydraulic pump and a first suction port of the swing hydraulic motor to each other;
a second main oil passage that connects a second discharge port of the swing hydraulic pump and a second suction port of the swing hydraulic motor to each other;
a neutral retention valve that is disposed in the first main oil passage and the second main oil passage and controls passage of the hydraulic oil;
a regenerative energy absorbing device that is coupled to the power take-off and absorbs regenerative energy generated by the hydraulic oil supplied from the swing hydraulic motor to the swing hydraulic pump via a meter-out opening of the neutral retention valve;
a valve control section that controls an area of the meter-out opening based on a state of the regenerative energy absorbing device;
a state quantity acquisition section that acquires a state quantity indicating the state of the regenerative energy absorbing device; and
a device hydraulic pump coupled to the power take-off and driven by the engine,
wherein the valve control section controls the area of the meter-out opening based on the state quantity,
wherein the regenerative energy absorbing device includes the device hydraulic pump,
the regenerative energy includes regenerative torque generated by the swing hydraulic pump,
the state quantity includes consumption torque of the device hydraulic pump, and
the valve control section reduces the area of the meter-out opening when the regenerative torque exceeds the consumption torque.

2. The excavator according to claim 1,
wherein the regenerative energy absorbing device includes the engine,
the state quantity includes a rotational speed of the engine, and
the valve control section reduces the area of the meter-out opening when the rotational speed of the engine exceeds an allowable rotational speed.

3. A method of controlling an excavator,
the excavator including:
a power take-off;
an engine coupled to the power take-off;
a swing hydraulic pump coupled to the power take-off and driven by the engine;
a swing hydraulic motor driven by hydraulic oil discharged from the swing hydraulic pump;
a first main oil passage that connects a first discharge port of the swing hydraulic pump and a first suction port of the swing hydraulic motor to each other;
a second main oil passage that connects a second discharge port of the swing hydraulic pump and a second suction port of the swing hydraulic motor to each other; and
a neutral retention valve that is disposed in the first main oil passage and the second main oil passage and controls passage of the hydraulic oil,
a regenerative energy absorbing device that is coupled to the power take-off and absorbs regenerative energy generated by the hydraulic oil supplied from the swing hydraulic motor to the swing hydraulic pump via a meter-out opening of the neutral retention valve;
a valve control section that controls an area of the meter-out opening based on a state of the regenerative energy absorbing device;
a state quantity acquisition section that acquires a state quantity indicating the state of the regenerative energy absorbing device; and
a device hydraulic pump coupled to the power take-off and driven by the engine, the method comprising:
acquiring the state of the regenerative energy absorbing device that is coupled to the power take-off and absorbs the regenerative energy generated by the hydraulic oil supplied from the swing hydraulic motor to the swing hydraulic pump via the meter-out opening of the neutral retention valve; and
controlling the area of the meter-out opening based on the state of the regenerative energy absorbing device,
wherein the valve control section controls the area of the meter-out opening based on the state quantity,
wherein the regenerative energy absorbing device includes the device hydraulic pump,
the regenerative energy includes regenerative torque generated by the swing hydraulic pump,
the state quantity includes consumption torque of the device hydraulic pump, and
the valve control section reduces the area of the meter-out opening when the regenerative torque exceeds the consumption torque.

* * * * *